United States Patent
Chang (10) Patent No.: US 9,921,935 B2
(45) Date of Patent: Mar. 20, 2018

(54) SYSTEM-ON-CHIP AND LOAD IMBALANCE DETECTING METHOD THEREOF

(71) Applicant: SAMSUNG ELECTRONICS CO., LTD., Suwon-si, Gyeonggi-Do (KR)

(72) Inventor: In-Gwang Chang, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 645 days.

(21) Appl. No.: 14/490,923

(22) Filed: Sep. 19, 2014

(65) Prior Publication Data

US 2015/0260787 A1 Sep. 17, 2015

(30) Foreign Application Priority Data

Mar. 11, 2014 (KR) .................. 10-2014-0028463

(51) Int. Cl.
*G06F 11/34* (2006.01)

(52) U.S. Cl.
CPC ...... *G06F 11/3433* (2013.01); *G06F 2201/88* (2013.01)

(58) Field of Classification Search
CPC . G01R 31/2884; G01R 19/2513; G06F 11/30; G06F 11/3433; G06F 2201/88; G06F 13/4022
USPC .............. 710/110, 29, 316; 324/750.3, 754.1
See application file for complete search history.

(56) References Cited

U.S. PATENT DOCUMENTS

| | | | |
|---|---|---|---|
| 6,704,812 B2 * | 3/2004 | Bakke | G06F 13/385 710/105 |
| 7,366,092 B2 | 4/2008 | Moll et al. | |
| 8,468,286 B2 | 6/2013 | Yao et al. | |
| 2001/0056515 A1 * | 12/2001 | Jacobs | G06F 13/364 710/240 |
| 2008/0198867 A1 | 8/2008 | Moll et al. | |
| 2011/0197048 A1 * | 8/2011 | Chung | G06F 9/5083 712/30 |
| 2012/0054423 A1 | 3/2012 | Wang et al. | |
| 2012/0089758 A1 | 4/2012 | Yun et al. | |
| 2012/0137090 A1 | 5/2012 | Biswas et al. | |
| 2012/0246368 A1 * | 9/2012 | Kwon | G06F 13/4022 710/110 |
| 2013/0097321 A1 * | 4/2013 | Tumbde | H04L 67/1008 709/226 |
| 2013/0111084 A1 * | 5/2013 | Wang | H04L 47/624 710/54 |
| 2013/0124907 A1 | 5/2013 | Aoki | |
| 2013/0232346 A1 | 9/2013 | Wu | |

* cited by examiner

*Primary Examiner* — Melissa Koval
*Assistant Examiner* — Courtney McDonnough
(74) *Attorney, Agent, or Firm* — F. Chau & Associates, LLC (57) ABSTRACT

A system-on-Chip (SoC) and a load imbalance detecting method of the same are provided. The SoC includes at least one master, a plurality of slaves, an interconnect, a measurement block, a central controller. The interconnect is configured to connect the at least one master and each of the plurality of slaves. The measurement block is configured to connect each of the plurality of slaves and the interconnect using a channel and to measure a load of each of the plurality of slaves. The central controller is configured to measure a load imbalance among the plurality of channels using the measured load information.

19 Claims, 8 Drawing Sheets

SYSTEM-ON-CHIP AND LOAD IMBALANCE DETECTING METHOD THEREOF

CROSS-REFERENCE TO RELATED APPLICATION

This application claims priority under 35 U.S.C. § 119 to Korean Patent Application No. 10-2014-0028463, filed on Mar. 11, 2014 in the Korean Intellectual Property Office, the disclosure of which is incorporated by reference herein in its entirety.

TECHNICAL FIELD

Embodiments of the inventive concept relate to a System-on-Chip (SoC), and more particularly, to a circuit and method that detect load imbalance in the SoC.

DISCUSSION OF THE RELATED ART

A System-on-Chip (SoC) is a technique that integrates a complex system having various functions to a single semiconductor chip. Due to a convergence tendency that integrates a computer, communication, broadcast, etc., demands for Application Specific Integrated Circuit (ASIC) and Application Specific Standard Product (ASSP) move to the SoC.

The SoC includes Intellectual Property (IP) blocks. The IP blocks perform a specific function in the SoC. Generally, these IP blocks are connected through a bus.

An Advanced Microcontroller Bus Architecture (AMBA) of Advanced RISC Machine (ARM) company may be applied as an exemplary bus standard for connecting and managing the IP blocks. There are an Advanced High-Performance Bus (AHB), an Advanced Peripheral Bus (APB), an Advanced eXtensible Interface (AXI), etc., in a bus type of AMBA.

SUMMARY

Various exemplary embodiments of the inventive concept provide a system-on-chip (SoC) detecting a load imbalance. Various exemplary embodiments of the inventive concept also provide a load imbalance detecting method of the SoC.

In accordance with one aspect of the inventive concept, the SoC is provided. The SoC includes at least one master, a plurality of slaves, an interconnect, a measurement block, and a central controller. The interconnect is configured to connect the at least one master and each of the plurality of slaves. The measurement block is configured to connect each of the plurality of slaves and the interconnect using a plurality of channels and to measure a load of each of the plurality of slaves. The central controller is configured to measure a load imbalance among the plurality of channels using the measured load information.

In an exemplary embodiment, the central controller may multiply a weight by each of a bandwidth, a latency, and an outstanding count with regard to each of the plurality of slaves, adds the multiplied results, and measures a load with regard to each of the plurality of slaves.

In an exemplary embodiment, the weight may include an importance with regard to each of the bandwidth, the latency, and the outstanding count.

In an exemplary embodiment, the central controller may calculate one of a minimum load value, a maximum load value, and a load variance with regard to a load of each of the plurality of slaves.

In an exemplary embodiment, the central controller may determine a load imbalance among the plurality of channels based on one of the minimum load value, the maximum load value, and the load variance.

In an exemplary embodiment, the at least one master may include an application processor, and the application processor may operate a dynamic voltage & frequency scaling (DVFS) based on one of the minimum load value, the maximum load value, and the load variance.

In an exemplary embodiment, the load of each of the plurality of slaves may be measured using a bandwidth, a latency, and an outstanding count with regard to each of the plurality of slaves.

In an exemplary embodiment, the interconnect may be redesigned based on the load imbalance information.

In an exemplary embodiment, each of the plurality of slaves may include a memory instance.

In an exemplary embodiment, the at least one master may transfer a request to one of the plurality of slaves, and a slave that receives the request may transfer a response corresponding to the request to the at least one master.

In accordance with an aspect of the inventive concept, a load imbalance detecting method of an SoC including at least one master, a plurality of slaves, and an interconnect that connects the at least one master and the plurality of slaves with each other is provided. The method includes measuring a load with regard to each of the plurality of slaves using a plurality of channels and measuring a load imbalance among the plurality of channels using the measured load information.

In an exemplary embodiment, the measuring of the load with regard to each of the plurality of slaves using the plurality of channels further may includes multiplying a weight by each of a bandwidth, a latency, and an outstanding count with regard to each of the plurality of slaves, adding the multiplied results with each other, and measuring the load with regard to each of the plurality of slaves based on the added results.

In an exemplary embodiment, the weight may include an importance of each of the bandwidth, the latency, and the outstanding count.

In an exemplary embodiment, the measuring of the load with regard to each of the plurality of slaves based on the added results may include calculating a minimum load value, a maximum load value, and a load variance with regard to the load of each of the plurality of slaves.

In an exemplary embodiment, the at least one master may include an application processor, and the method may further include performing a dynamic voltage & frequency scaling (DVFS) method based on the minimum load value, the maximum load value, and the load variance with regard to the load of each of the plurality of slaves by the application processor.

In accordance with an aspect of the inventive concept, a mobile device is provided. The mobile device includes a plurality of slaves, a plurality of masters, a plurality of channel efficiency enhancers, an interconnect, a plurality of measurement components, and a control controller. The plurality of masters is configured to generate requests with target addresses to access the plurality of slaves. The plurality of channel efficiency enhancers is configured to convert the target addresses received from the plurality of masters to access the plurality of slaves. The interconnect is configured to connect the at least one master and each of the plurality of slaves based on the converted target addresses. The plurality of measurement components is configured to measure loads of the plurality of slaves. The central controller is configured to measure a load imbalance information among the plurality of channels using the measured load information.

In an exemplary embodiment, the central controller may transmit the load imbalance information to at least one of the plurality of masters, the plurality of channel efficiency enhancers, and the interconnect.

In an exemplary embodiment, one of the plurality of channel efficiency enhancers may update an address conversion table to match the target addresses to the converted target addresses based on the load imbalance information.

In an exemplary embodiment, the load imbalance information may include a latency value, a bandwidth value, and an outstanding count value.

In an exemplary embodiment, the load imbalance information may further include weight values each of which corresponds to the latency value, the bandwidth value, and the outstanding count value.

BRIEF DESCRIPTION OF THE DRAWINGS

The foregoing and other features of the inventive concepts will be apparent by describing in detailed exemplary embodiments thereof, as illustrated in the accompanying drawings in which like reference characters may refer to the same parts throughout the different views. The drawings are not necessarily to scale, emphasis instead being placed upon illustrating the principles of the inventive concepts. In the drawings.

DETAILED DESCRIPTION OF THE EMBODIMENTS

Various exemplary embodiments of the inventive concept are described below in sufficient detail to enable those of ordinary skill in the art to embody and practice the inventive concept. The inventive concept may be embodied in many alternative forms, and should not be construed as limited to the exemplary embodiments set forth herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

It will be understood that, although the terms first, second, A, B, etc. may be used herein in reference to elements of the inventive concept, such elements should not be construed as limited by these terms. For example, a first element could be termed a second element, and a second element could be termed a first element, without departing from the scope of the inventive concept. Herein, the term "and/or" includes any and all combinations of one or more referents.

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (e.g., rotated 90 degrees or at other orientations), and the spatially relative descriptors used herein may be interpreted accordingly.

The terminology used herein to describe embodiments of the inventive concept is not intended to limit the scope of the inventive concept. The articles "a," "an," and "the" are singular in that they have a single referent, however the use of the singular form in the present document should not preclude the presence of more than one referent. In other words, elements of the inventive concept referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the inventive concept.

Unless otherwise defined, all terms (including technical and scientific terms) used herein are to be interpreted as is customary in the art to which this inventive concept belongs. It will be further understood that terms in common usage should also be interpreted as is customary in the relevant art and not in an idealized or overly formal sense unless expressly so defined herein.

Embodiments of the inventive concept will be described below with reference to attached drawings.

Figure 1:
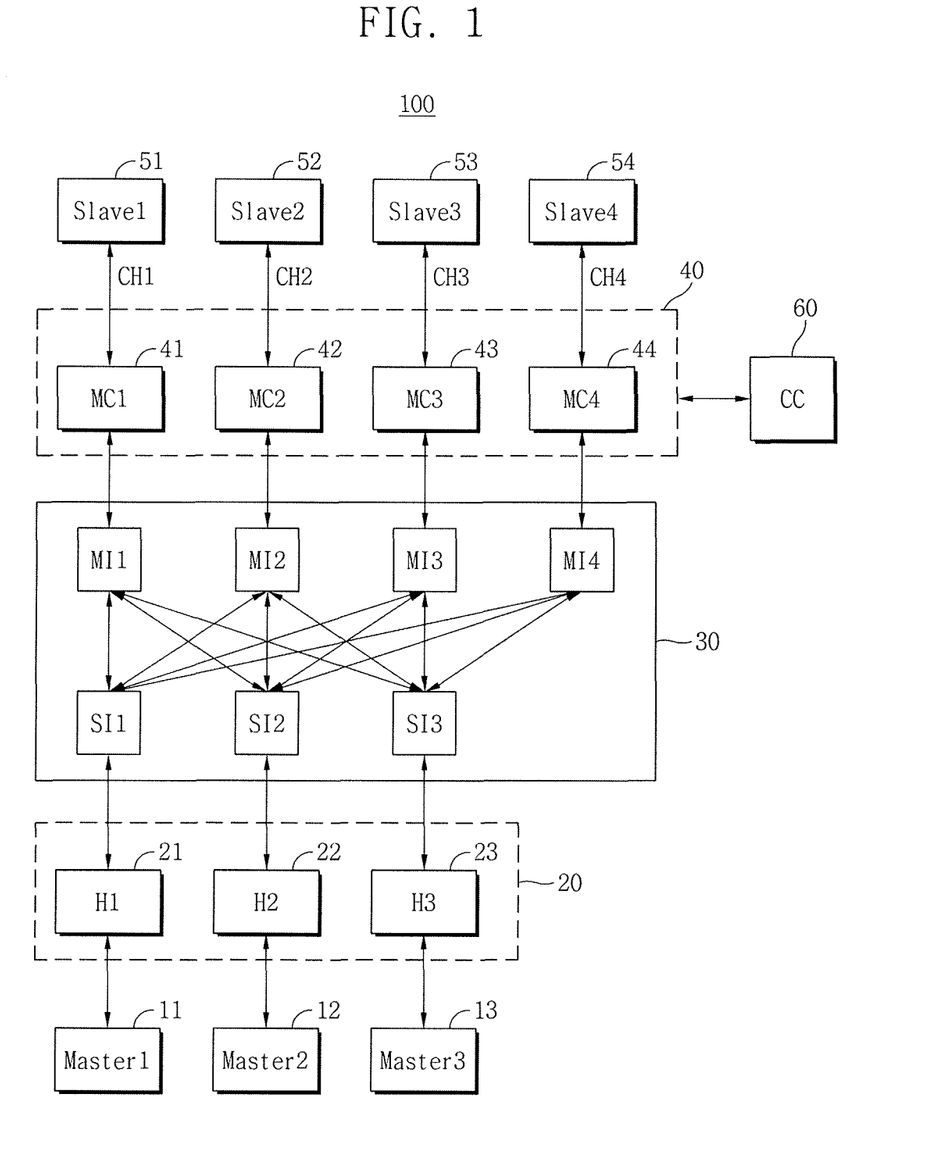
FIG. 1 shows a system-on-chip (SoC) according to an exemplary embodiment of the inventive concept.

FIG. 1 shows a system-on-chip (SoC) according to an exemplary embodiment of the inventive concept.

Referring to FIG. 1, the SoC 100 according to an exemplary embodiment of the inventive concept includes first to third masters 11 to 13, first to fourth slaves 51 to 54, and an interconnect 30 configured to connect the first to third masters 11 to 13 and the first to fourth slaves 51 to 54 through a channel. The SoC 100 may be implemented with one package that is manufactured as a singular chip.

Further, each of the first to third masters 11 to 13 may be connected to each of the first to fourth slaves 51 to 54 through the channel.

The SoC 100 may further include a channel efficiency enhancement block 20 configured to connect each of the first to third masters 11 to 13 and the interconnect 30 to improve a channel efficiency of each of the first to third masters 11 to 13. The SoC 100 may further include a measurement block 40 configured to measure a load of each of the first to fourth slaves 51 to 54.

The channel efficiency enhancement block 20 includes a first channel efficiency enhancer 21 which is connected between the first master 11 and the interconnect 30, a second channel efficiency enhancer 22 which is connected between the second master 12 and the interconnect 30, and a third channel efficiency enhancer 23 which is connected between the third master 13 and the interconnect 30.

The measurement block 40 includes a first measurement component 41 configured to measure a load of the first slave 51, a second measurement component 42 configured to measure a load of the second slave 52, a third measurement component 43 configured to measure a load of the third slave 53, and a fourth measurement component 44 configured to measure a load of the fourth slave 54.

In an exemplary embodiment, the load may be measured using a bandwidth, a latency, and an outstanding count.

Moreover, the SoC 100 further includes a central controller 60 configured to control the measurement block 40. The central controller 60 receives load information with regard to first to fourth channels CH1 to CH4 from each of the first to fourth measurement components 41 to 44. The central controller 60 may generate load imbalance information with regard to the first to fourth channels CH1 to CH4 using the load information. A system designer may reconfigure a system bus using the load imbalance information.

Further, when the SoC 100 is installed in a mobile device, one of the first to third masters 11 to 13 may be embodied in an application processor. The application processor may control an operation voltage and an operation clock frequency of the SoC 100 using a dynamic voltage & frequency scaling (DVFS) method based on the load imbalance information.

The interconnect 30 includes first to third slave interface units SI1 to SI3 and first to fourth master interface units MI1 to MI4. Each of the first to third slave interface units SI1 to SI3 may be connected to one of the first to fourth slaves 51 to 54. In addition, each of the first to fourth master interface units MI1 to MI4 may be connected to one of the first to third masters 11 to 13.

The first slave interface unit SI1 connects the first master 11 to one of the first to fourth slaves 51 to 54. The second slave interface unit SI2 connects the second master 12 to one of the first to fourth slaves 51 to 54. The third slave interface unit SI3 connects the third master 13 to one of the first to fourth slaves 51 to 54. The first to third slave interface units SI1 to SI3 are described with reference to FIGS. 2A to 2C.

The first master interface unit MI1 connects the first slave 51 to one of the first to third masters 11 to 13. The second master interface unit MI2 connects the second slave 52 to one of the first to third masters 11 to 13. The third master interface unit MI3 connects the third slave 53 to one of the first to third masters 11 to 13. In addition, the fourth master interface unit MI4 connects the fourth slave 54 to one of the first to third masters 11 to 13. The first to fourth master interface units MI1 to MI4 are described with reference to FIGS. 3A to 3D.

Each of the first to third masters 11 to 13 may be implemented as a microprocessor, a graphic processor, an Intellectual Property (IP) for designing an SoC, etc.

Further, the first master 11 may bypass the first channel efficiency enhancer 21 and be connected to the interconnect 30. The first master 11 may access one of the first to fourth slaves 51 to 54 through the interconnect 30.

For example, the first master 11 may transfer a request to the first slave 51. When the first slave 51 receives the request output from the first master 11 through the interconnect 30, the first slave 51 may transfer a response corresponding to the request to the first master 11 through the interconnect 30.

An index may indicate a load of the interconnect 30. The index may include at least one of a latency, a bandwidth, and an outstanding count. The SoC may detect the load of one of the first to fourth slaves 51 to 54, for example, one of memory instances based on the index.

The first master 11 may transfer a request to one of the first to fourth slaves 51 to 54 through the interconnect 30. Here, a signal path that transfers the request is referred to as a channel.

The first measurement component 41 may measure at least one of the latency, the bandwidth, and the outstanding count with regard to the first master 11 and the first slave 51 based on the request transferred from the first master 11 and the response transferred from the first slave 51.

The bandwidth can be defined as an amount of transferred data during a unit of time. Bit per second (bps) may be used as the unit of the bandwidth. For example, the bandwidth means a number of bits of data transferred during 1 second. The latency can be defined a time interval between outputting a command to a slave by a master to responding to the command by the slave. The outstanding count can be defined as a number of requests that are newly requested before a previous work is completed. A method of measuring the outstanding count is described with reference to FIG. 4.

In an exemplary embodiment, the interconnect 30 is implemented according to an Advanced eXtensible Interface protocol of Advanced Microcontroller Bus Architecture 3 (AMBA3) or AMBA4 by ARM™.

Each of the first to fourth slaves 51 to 54 may be embodied in a memory controller, a display device, an image sensor, etc.

Further, each of the first to fourth slaves 51 to 54 may be implemented with an IP for designing an SoC.

The SoC 100 may be implemented with an integrated circuit. Further, the SoC 100 may be embedded in a mobile communication device such as a mobile phone, a smartphone, a tablet personal computer (PC), or personal digital assistant (PDA). In an exemplary embodiment, the SoC 100 may be embedded in an information technology device or a portable electronic device.

Each of the three indexes, e.g., the bandwidth, the latency, and the outstanding count may have an independent value. The SoC 100 may take into account the bandwidth, the latency, and the outstanding count as a whole to evaluate the load of one of the first to fourth slaves 51 to 54.

A load of each of the plurality of slaves may be calculated using a method of multiplying a coefficient (e.g., a weight) to each of the three indexes and adding the multiplied results.

A system designer may check a load imbalance of the interconnect 30 using the load information. The system designer may check the load imbalance of the interconnect 30 in real time.

Figure 2A:
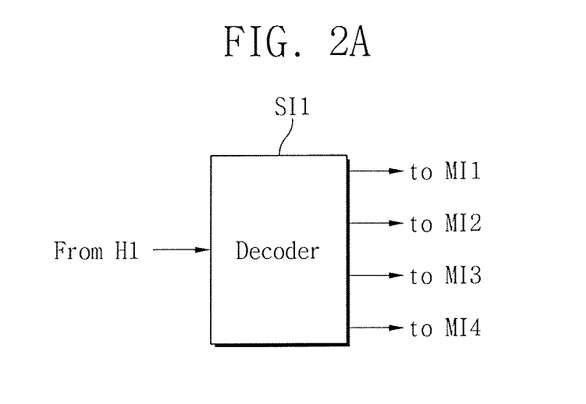
FIGS. 2A to 2C are block diagrams illustrating a slave interface unit shown in FIG. 1.
Figure 2B:
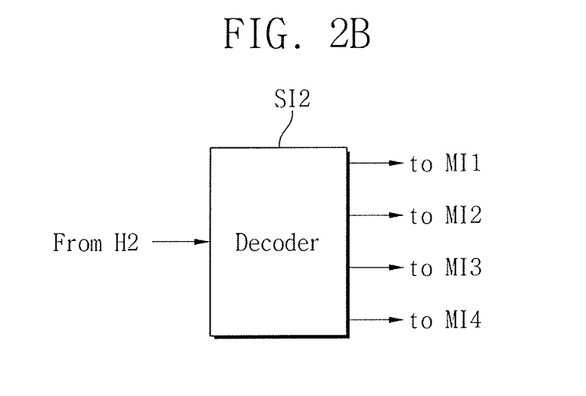
Figure 2C:
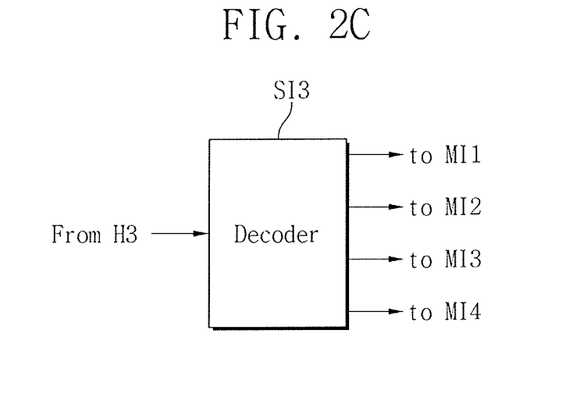

FIGS. 2A to 2C are block diagrams illustrating a slave interface unit shown in FIG. 1.

Referring to FIGS. 1 and 2A, the first master 11 transfers a request to the first slave interface unit SI1 through the first channel efficiency enhancer 21. The first slave interface unit SI1 transfers the request to one of the first to fourth master interface units MI1 to MI4. In an exemplary embodiment, the first slave interface unit SI1 may be implemented with a decoder.

Referring to FIGS. 1 and 2B, the second master 12 transfers a request to the second slave interface unit SI2 through the second channel efficiency enhancer 22. The second slave interface unit SI2 transfers the request to one of the first to fourth master interface units MI1 to MI4. In an exemplary embodiment, the second slave interface unit SI2 may be implemented with a decoder.

Referring to FIGS. 1 and 2C, the third master 13 transfers a request to the third slave interface unit SI3 through the third channel efficiency enhancer 23. The third slave interface unit SI3 transfers the request to one of the first to fourth master interface units MI1 to MI4. In an exemplary embodiment, the third slave interface unit SI3 may be implemented with a decoder.

FIGS. 3A to 3D are block diagrams illustrating a master interface unit shown in FIG. 1.

Figure 3A:
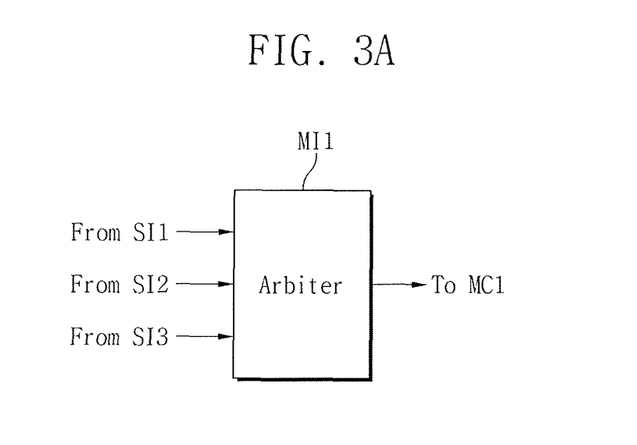
FIGS. 3A to 3D are block diagrams illustrating a master interface unit shown in FIG. 1.

Referring to FIGS. 1 and 3A, the first master interface unit MI1 may connect one of the first to third slave interface units SI1 to SI3 to the first measurement component 41. In an exemplary embodiment, the first master interface unit MI1 may be implemented with an arbiter.

Figure 3B:
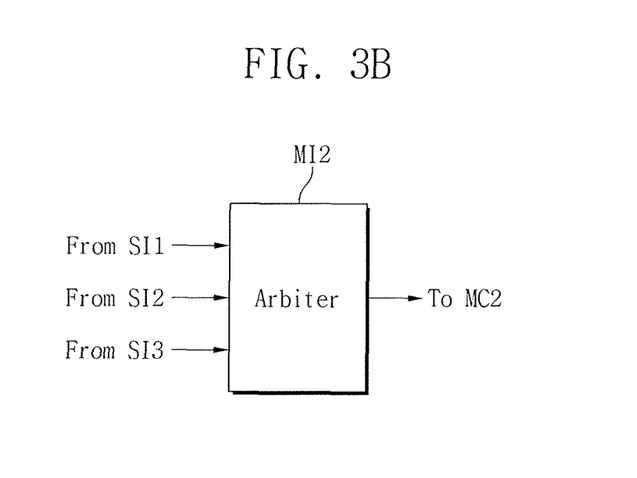

Referring to FIGS. 1 and 3B, the second master interface unit MI2 may connect one of the first to third slave interface units SI1 to SI3 to the second measurement component 42. In an exemplary embodiment, the second master interface unit MI2 may be implemented with an arbiter.

Figure 3C:
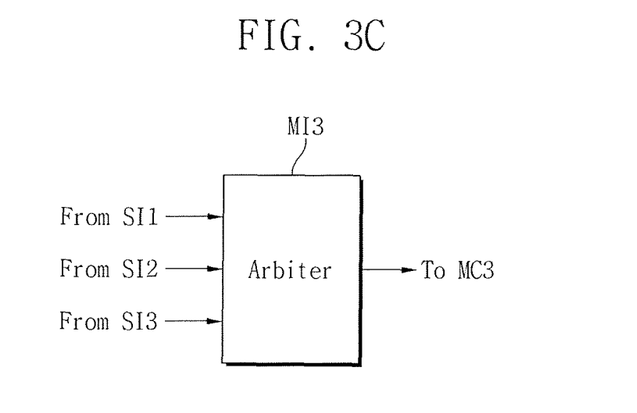

Referring to FIGS. 1 and 3C, the third master interface unit MI3 may connect one of the first to third slave interface units SI1 to SI3 to the third measurement component 43. In an exemplary embodiment, the third master interface unit MI3 may be implemented with an arbiter.

Figure 3D:
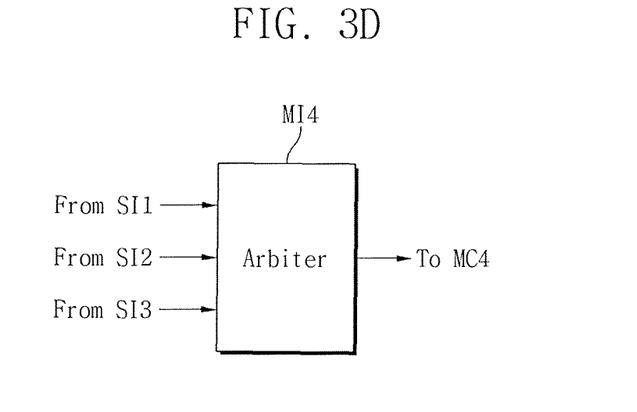

Referring to FIGS. 1 and 3D, the fourth master interface unit MI4 may connect one of the first to third slave interface units SI1 to SI3 to the fourth measurement component 44. In an exemplary embodiment, the fourth master interface unit MI4 may be implemented with an arbiter.

Figure 4:
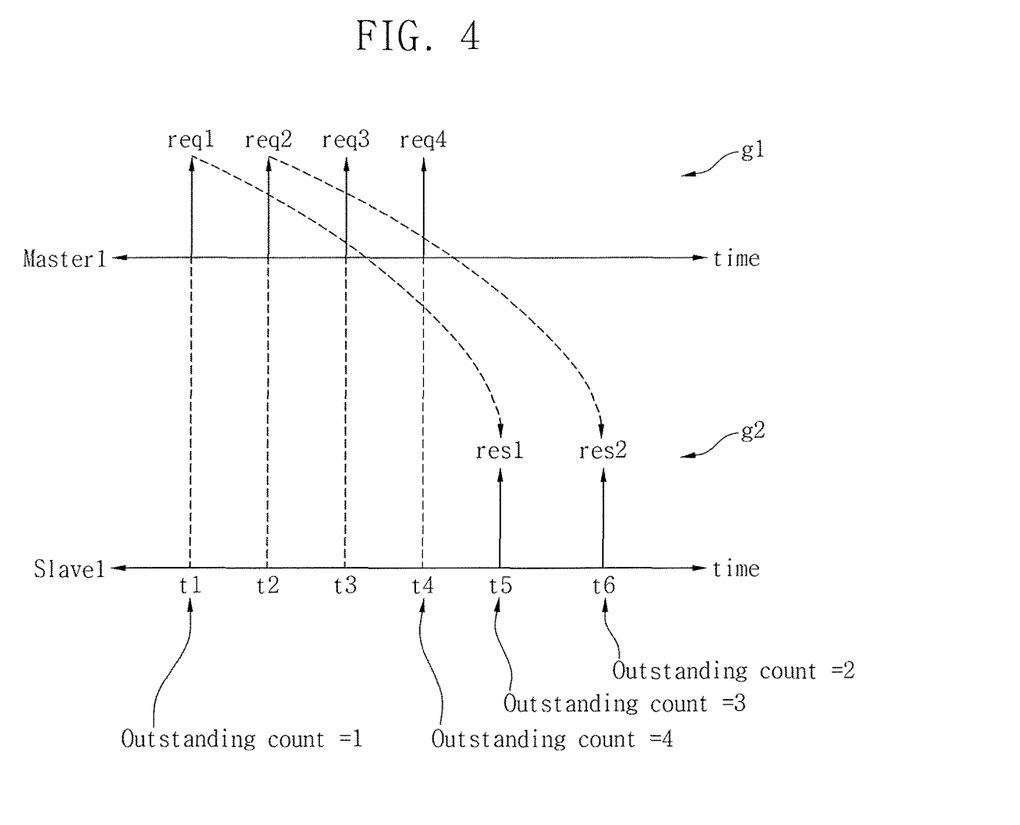
FIG. 4 is a conceptual diagram for describing an outstanding count.

FIG. 4 is a conceptual diagram for describing an outstanding count.

Referring to FIGS. 1 and 4, a first graph g1 shows a request of the first master 11 according to an increase of time. A second graph g2 shows a response of the first slave 51 according to an increase of time.

In a time t1, the first master 11 transfers a first request req1 to the first slave 51 through the interconnect 30. Here, the outstanding count is 1.

In a time t2, the first master 11 transfers a second request req2 to the first slave 51 through the interconnect 30. Here, the outstanding count is 2.

In a time t3, the first master 11 transfers a third request req3 to the first slave 51 through the interconnect 30. Here, the outstanding count is 3.

In a time t4, the first master 11 transfers a fourth request req4 to the first slave 51 through the interconnect 30. Here, the outstanding count is 4.

In a time t5, the first slave 51 transfers a first response rest corresponding to the first request reg1 to the first master 11 through the interconnect 30. Here, the outstanding count is 3.

In a time t6, the first slave 51 transfers a second response res2 corresponding to the second request req2 to the first master 11 through the interconnect 30. Here, the outstanding count is 2. For example, the outstanding count increases by 1, whenever the first master 11 transfers a request to the first slave 51. The outstanding count decreases by 1, whenever the first slave 51 transfers a response to the first master 11.

Figure 5:
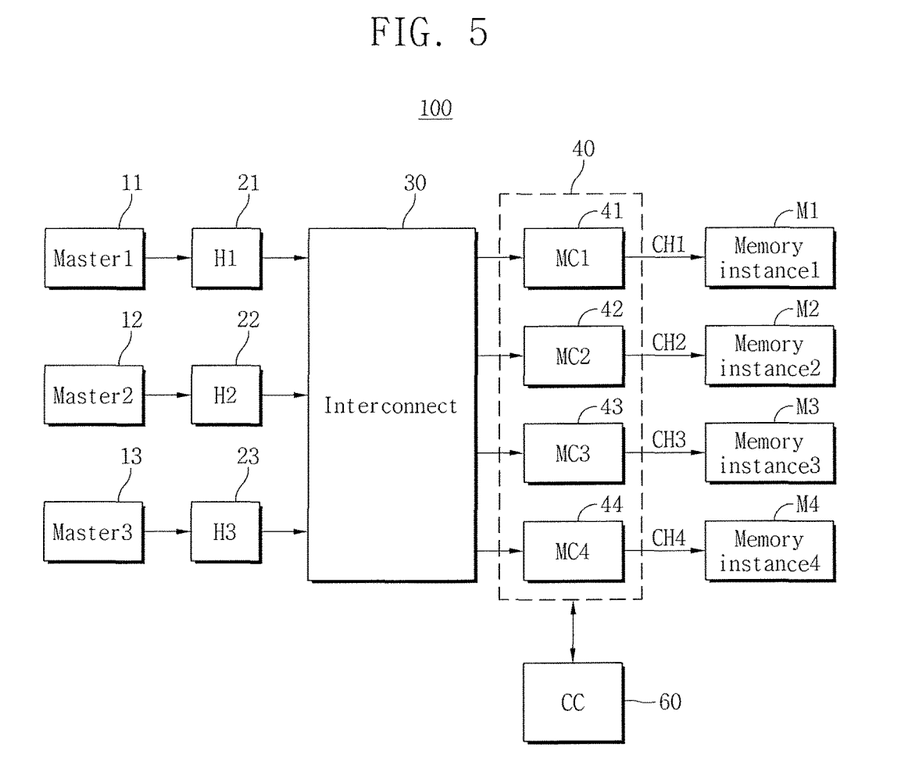
FIG. 5 is a block diagram illustrating the SoC shown in FIG. 1.

FIG. 5 is a block diagram illustrating the SoC shown in FIG. 1.

Referring to FIGS. 1 and 5, the SoC 100 includes a plurality of masters 11 to 13, a plurality of channel efficiency enhancer 21 to 23, an interconnect 30, a measurement block 40 having a plurality of measurement component 41 to 44, a central controller 60, and a plurality of slaves M1 to M4.

The performance of the SoC 100 may be evaluated according to a processing speed of a bulk of multimedia data. The data processing speed of the SoC 100 may depend on how fast the SoC 100 processes data traffic between the first to fourth slaves 51 to 54, for example, memories and the first to third masters 11 to 13, for example, the internal IP in the SoC 100. If traffics are concentrated in a certain slave, a bandwidth provided by the interconnect 30 may decrease.

The plurality of channel efficiency enhancers 21 to 23 are connected respectively between the plurality of masters 11 to 13 and the interconnect 30. Each of the plurality of channel efficiency enhancer 21 to 23 may receive a read request or a write request with a target address from its corresponding master out of the masters 11 to 13 to access one of memories M1 to M4 through the slaves channels CH1 to CH4. The first channel efficiency enhancer 21 may receive load imbalance information from the central controller 60.

The plurality of channel efficiency enhancers 21 to 23 may change the received target address based on the received load imbalance information and distribute loads of each of the slave channels CH1 to CH4. An address conversion table to match the received target address from the first master 11 to a converted target address may be stored in one of the memories M1 to M4. For example, the plurality of channel efficiency enhancers may update an address conversion table to match the target addresses with the converted target addresses based on the load imbalance information.

The interconnect 30 may receive the read request or write request with the converted target address and arbitrate the read/write requests based on the load imbalance information and may change the order of responses to the read/write requests received from the plurality of masters 11 to 13 through the plurality of channel efficiency enhancers 21 to 23. Accordingly, the interconnect 30 may avoid a load imbalance occasion and meet a bandwidth requirement.

Each of the first to fourth slaves 51 to 54 shown in FIG. 1 may include one of the first to fourth memory instances M1 to M4. In an exemplary embodiment, each of the first to fourth memory instances M1 to M4 may be implemented with a Dynamic Random Access Memory (DRAM) memory device.

Referring to FIG. 5, the first master 11 may access one of the first to fourth memory instances M1 to M4 through the interconnect 30. For example, if the first master 11 accesses the first memory instance M1 through the interconnect 30, the first measurement component 41 measures a load of the first memory instance M1.

The first measurement component 41 may measure a bandwidth, a latency, and an outstanding count of the first channel CH1 using the request from the first master 11 and the response from the first memory instance M1. Here, the traffic of the first channel CH1 may be higher than that of each of the second to fourth channels CH2 to CH4. For example, if the traffic is concentrated to the first memory instance M1, a bandwidth provided by the interconnect 30 and a latency provided to the first master 11 may be reduced.

Moreover, the second measurement component 42 may measure a bandwidth, a latency, and an outstanding count of the second channel CH2 using the request from the second master 12 and the response from the second memory instance M2.

Further, the third measurement component 43 may measure a bandwidth, a latency, and an outstanding count of the third channel CH3 using the request from the third master 13 and the response from the third memory instance M3.

Likewise, the fourth measurement component 44 may measure a bandwidth, a latency, and an outstanding count of the fourth channel CH4 using the request from the fourth master 14 and the response from the fourth memory instance M4.

A method of increasing a bandwidth is to lower the difference of a load among the memory instances. When a SoC includes conventional IPs such as CCI-400 of ARM company, NOC of Arteris company, etc., to distribute a traffic, generality and compatibility may cause a problem only to use a data address for traffic distribution. Accordingly, an SoC designer adds a traffic distribution circuit to the IPs to solve the problem of traffic distribution.

In addition, to raise a traffic distribution effect by the interconnect 30, an address transformation device may be added to input channels and output channels of the interconnect 30.

To identify whether the traffic distribution circuit precisely operates, a method of measuring a load of channels is required.

To meet this requirement, the SoC 100 according to an exemplary embodiment of the inventive concept may detect a load imbalance among the channels. The load imbalance can be evaluated based on the three indexes, e.g., a latency, a bandwidth, and an outstanding count on each channel CH1 to CH4 connected to one of the first to fourth slaves 51 to 54. The central controller 60 may multiply a weight to each of the bandwidth, the latency, and the outstanding count, calculate a load of each of the first to fourth slaves 51 to 54 by adding the multiplied results, and determine the load imbalance among the channels CH1 to CH4 connected to the first and fourth slaves 51 to 54.

The central controller 60 may calculate one of a minimum load value, a maximum load value, a mean load value, and a load variance of a load corresponding to each of the first to fourth slaves 51 to 54. The central controller 60 may determine a load imbalance among the first to fourth channels CH1 to CH4 based on one of the minimum load value, the maximum load value, the mean load value, and the load variance of a load corresponding to each of the first to fourth slaves 51 to 54.

A method of calculating the minimum load value, the maximum load value, the mean load value, and the load variance of a load of each of the first to fourth slaves 51 to 54 is described with reference to Equations 1 to 4.

Equation 1 is a formula that calculates the minimum load value (Cmin) among the first to fourth channels CH1 to CH4.

$$Cmin=\min(CH1\cdot W1*L+CH1\cdot W2*B+CH1\cdot W3*M,$$
$$CH2\cdot W1*L+CH2\cdot W2*B+CH2\cdot W3*M,$$
$$CH3\cdot W1*L+CH3\cdot W2*B+CH3\cdot W3*M,$$
$$CH4\cdot W1*L+CH4\cdot W2*B+CH4\cdot W3*M) \quad \text{[Equation 1]}$$

Here, W1 is a weight for a latency (L), W2 is a weight for a bandwidth (B), and W3 is a weight for an outstanding count (M). The min function outputs the minimum load value among weighted combination values based on the indexes which correspond to the slave channels CH1 to CH4.

The central controller 60 may calculate the minimum load value (Cmin) with regard to a load of each of the first to fourth slaves 51 to 54 using Equation 1.

Equation 2 is a formula that calculates the maximum load value (Cmax) among the first to fourth channels CH1 to CH4.

$$Cmax=\max(CH1\cdot W1*L+CH1\cdot W2*B+CH1\cdot W3*M,$$
$$CH2\cdot W1*L+CH2\cdot W2*B+CH2\cdot W3*M,$$
$$CH3\cdot W1*L+CH3\cdot W2*B+CH3\cdot W3*M,$$
$$CH4\cdot W1*L+CH4\cdot W2*B+CH4\cdot W3*M) \quad \text{[Equation 2]}$$

The max function outputs the maximum load value among weighted combination values based on the indexes which correspond to the slave channels CH1 to CH4. The central controller 60 may calculate the maximum load value (Cmax) with regard to a load of each of the first to fourth slaves 51 to 54 using Equation 2.

Equation 3 is a formula that calculates the mean load value (Cavg) among the first to fourth channels CH1 to CH4.

$$Cavg=\text{avg}(CH1\cdot W1*L+CH1\cdot W2*B+CH1\cdot W3*M,$$
$$CH2\cdot W1*L+CH2\cdot W2*B+CH2\cdot W3*M,$$
$$CH3\cdot W1*L+CH3\cdot W2*B+CH3\cdot W3*M,$$
$$CH4\cdot W1*L+CH4\cdot W2*B+CH4\cdot W3*M) \quad \text{[Equation 3]}$$

The avg function outputs the average load value among weighted combination values based on the indexes which correspond to the slave channels CH1 to CH4. The central controller 60 may calculate the mean load value (Cavg) with regard to a load of each of the first to fourth slaves 51 to 54 using Equation 3.

Equation 4 is a formula that calculates the load variance (Cvar) among the first to fourth channels CH1 to CH4.

$$Cvar=\text{var}(CH1\cdot W1*L+CH1\cdot W2*B+CH1\cdot W3*M,$$
$$CH2\cdot W1*L+CH2\cdot W2*B+CH2\cdot W3*M,$$
$$CH3\cdot W1*L+CH3\cdot W2*B+CH3\cdot W3*M,$$
$$CH4\cdot W1*L+CH4\cdot W2*B+CH4\cdot W3*M) \quad \text{[Equation 4]}$$

The var function outputs the load variance among weighted combination values based on the indexes which correspond to the slave channels CH1 to CH4. The central controller 60 may calculate the load variance (Cvar) with regard to a load of each of the first to fourth slaves 51 to 54 using Equation 4.

The central controller 60 may notify that a load imbalance occurs when one of the minimum load value, the maximum load value, the mean load value, and the load variance with regard to a load of each of the first to fourth slaves 51 to 54 exceeds an imbalance threshold.

For example, when the first master 11 is an application processor, the central controller 60 may notify at least one of the application processor, the channel efficiency enhancer 21 and the interconnect 30 of the occurrence of a load imbalance when the load of a slave channel that the first master 11 accesses exceeds a threshold load value.

A DVFS operation by the application processor or an address translation operation by the interconnect 30 may be performed based on one of the minimum load value, the maximum load value, the mean load value, and the load variance with regard to a load of each of the first to fourth slaves 51 to 54.

According to the access of at least one of the masters 11 to 13, the central controller 60 may assign an appropriate value to the weight value corresponding to each load index based on the load imbalance information. When the load imbalance information is changed due to the change of access requests by at least one of the masters 11 to 13, the central controller 60 may change the weight value on each index, (e.g. latency, bandwidth and outstanding count).

For example, when the number of requests by the masters 11 to 13 to access one of the memories M1 to M4 may increase the latency value in correspondence to the requests, the central controller 60 may detect the change of the latency value and receive load imbalance information from one of the measurement components 41 to 44. The central controller 60 may detect that the load imbalance exceeds the maximum load imbalance (Cmax). Accordingly, one of the masters 11 to 13 may perform a DVFS operation, the channel efficiency enhancers 21 to 23 may perform an address change operation from a target address to a converted address, and the interconnect 30 may arbitrate requests from the masters 11 to 13.

On the other hand, when the number of requests by the masters 11 to 13 to access one of the memories M1 to M4 can make at least one load of the memories M1 to M4 under the minimum load value, the central controller may notify at least one of the masters 11 to 13, the channel efficiency enhancer 21 to 23 and the interconnect 30 of the change of the load imbalance information to. At this time, one of the channel efficiency enhancer 21 to 23 may update the address conversion table to assign different slave channel from the previous slave channel and the interconnect 30 may distribute the requests from one of the masters 11 to 13 to the slave channels CH1 to CH2 in a different pattern.

If the central controller 60 wants to detect the load imbalance in view of latency, the central controller 60 may increase the weight value for the latency index to avoid the load imbalance quickly.

As the number of requests by the masters 11 to 13 to access one of the memories M1 to M4 increases, the outstanding count value or the bandwidth value can increase.

If the central controller 60 wants to detect the load imbalance in view of the outstanding count, the central controller 60 may increase the weight value for the outstanding count index to avoid the load imbalance quickly.

Moreover, if the central controller 60 wants to detect the load imbalance in view of the bandwidth, the central controller 60 may increase the weight value for the bandwidth index to avoid the load imbalance quickly.

Figure 6:
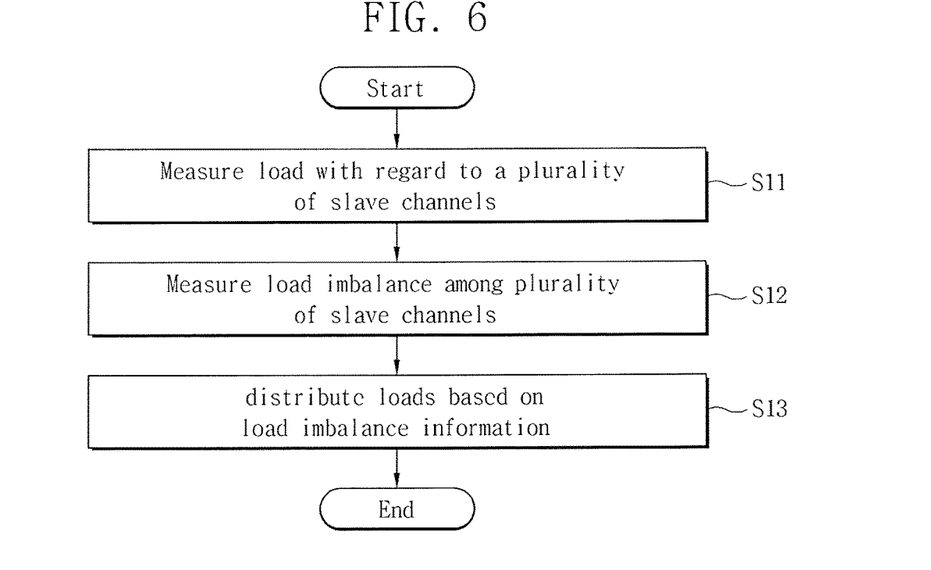
FIG. 6 is a flowchart for describing a method of the SoC shown in FIG. 5.

FIG. 6 is a flowchart for describing a method of the SoC shown in FIG. 5.

Referring to FIGS. 5 and 6, in step S11, the measurement block 40 may measure a load of each of the plurality of slaves using the plurality of channels. For example, the first measurement component 41 measures a load of the first slave 51 through the first channel CH1, the second measurement component 42 measures a load of the second slave 52 through the second channel CH2, the third measurement component 43 measures a load of the third slave 53 through the third channel CH3, and the fourth measurement component 44 measures a load of the fourth slave 54 through the fourth channel CH4.

In step S12, the central controller 60 may measure a load imbalance among the plurality of channels using the measured load information. For example, the central controller 60 may obtain load information of each of the first to fourth channels CH1 to CH4 using the measured load information.

In S13 step, the SoC may distribute loads among the slave channels CH1 to CH4 based on the load imbalance information. The channel utilization means a channel usage ratio in an allowed time period.

The SoC 100 may recognize a load imbalance among the first to fourth channels CH1 to CH4 using the minimum load value, the maximum load value, the mean load value, and the load variance. Accordingly, the system designer may redesign the system bus to balance a load among the first to fourth channels CH1 to CH4.

Figure 7:
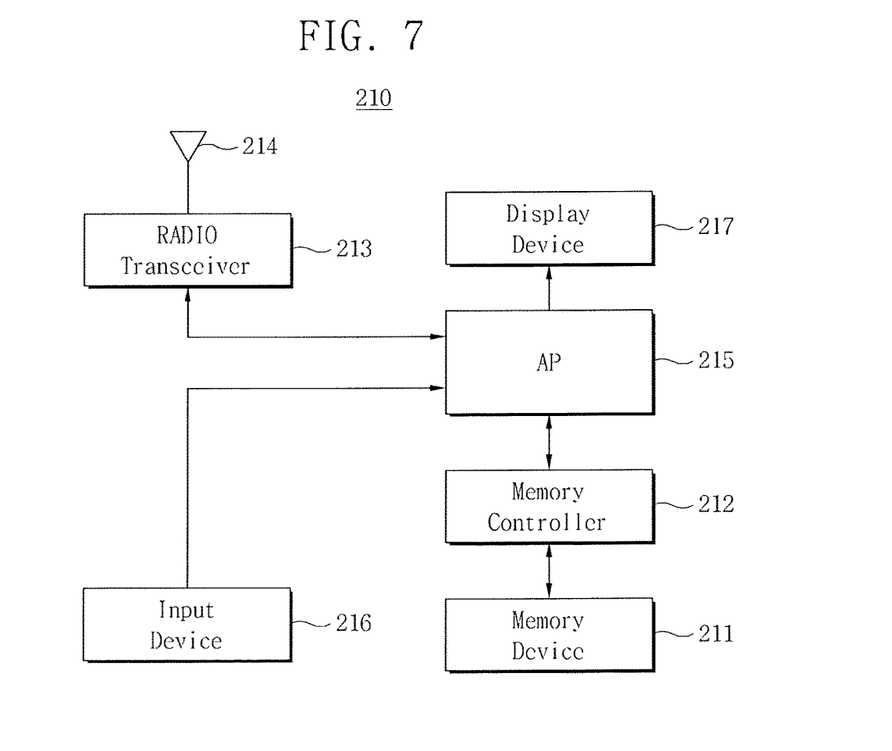
FIG. 7 is a block diagram illustrating an exemplary embodiment of a computer system 210 including the SoC shown in FIG. 1.

FIG. 7 is a block diagram illustrating an exemplary embodiment of a computer system 210 including the SoC shown in FIG. 1.

Referring to FIG. 7, the computer system 210 includes a memory device 211, a memory controller 212 configured to control the memory device 211, a radio transceiver 213, an antenna 214, an application processor 215, an input device 216, and a display unit 217.

The radio transceiver 213 may transmit or receive a radio signal via the antenna 214. For example, the radio transceiver 213 may transform the radio signal received via the antenna 214 to be processed by the application processor 215.

Thus, the application processor 215 may process a signal output from the radio transceiver 213, and transmit the processed signal to the display unit 217. Also, the radio transceiver 213 may transform a signal output from the application processor 215 into a radio signal, and output the radio signal to an external device (not shown) via the antenna 214.

The input device 216 is a device through which a control signal for controlling an operation of the application processor 215 or data that is to be processed by the application processor 215 is input. For example, the input device 216 may be embodied as a pointing device such as a touchpad, a computer mouse, a keypad, or a keyboard.

In an exemplary embodiment, the memory controller 212 configured to control an operation of the memory device 211 may be embodied as a part of the application processor 215, or may be embodied as a chip installed separately from the application processor 215.

In an exemplary embodiment, the application processor 315 may include the SoC 100 illustrated in FIG. 1.

Figure 8:
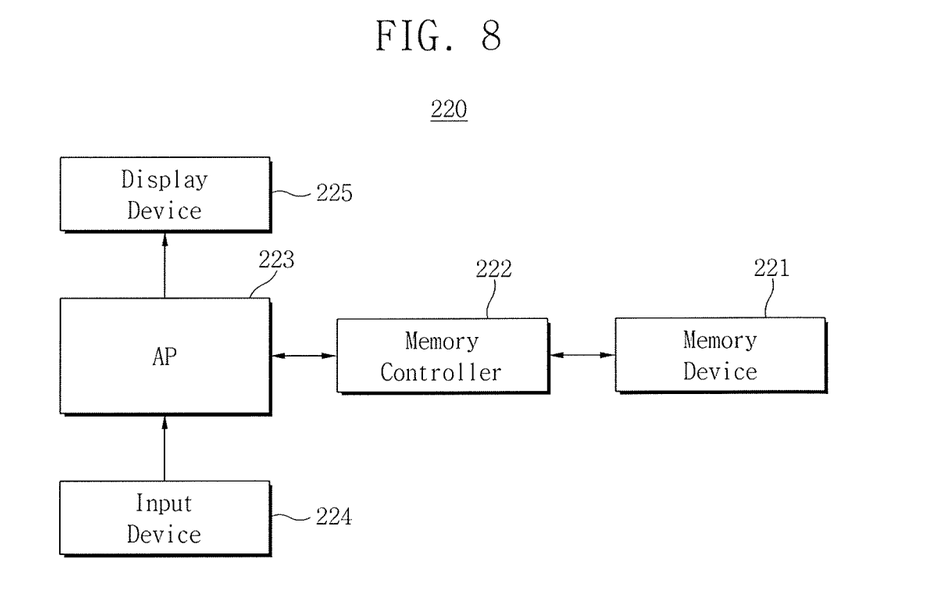
FIG. 8 is a block diagram illustrating an exemplary embodiment of a computer system 220 including the SoC shown in FIG. 1.

FIG. 8 is a block diagram illustrating an embodiment of a computer system 220 including the SoC shown in FIG. 1.

Referring to FIG. 8, the computer system 220 may be embodied as a PC, a network server, a tablet PC, a netbook, an e-reader, a personal digital assistant (PDA), a portable multimedia player (PMP), an MP3 player, or an MP4 player.

The computer system 220 includes a memory device 221 and a memory controller 222 configured to control data processing operations of the memory device 221, an application processor 223, an input device 224, and a display unit 225.

The application processor 223 may display data stored in the memory device 221 on the display unit 225, based on data input through the input device 224. For example, the input device 224 may be embodied as a pointing device such as a touchpad and a computer mouse, a keypad, or a keyboard. The application processor 223 may control overall operations of the computer system 220 and an operation of the memory controller 222.

In an exemplary embodiment, the memory controller 222 configured to control an operation of the memory device 221 may be embodied as a part of the application processor 223, or may be embodied as a chip installed separately from the application processor 223.

In an exemplary embodiment, the application processor 223 may include the SoC 100 illustrated in FIG. 1.

Figure 9:
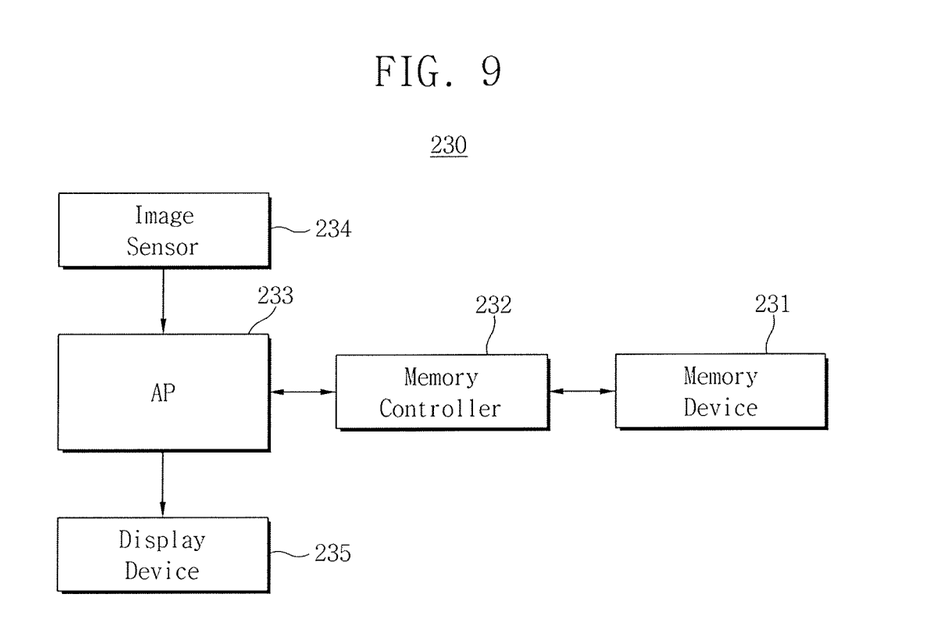
FIG. 9 is a block diagram illustrating an exemplary embodiment of a computer system 230 including the SoC shown in FIG. 1.

FIG. 9 is a block diagram illustrating an embodiment of a computer system 230 including the SoC shown in FIG. 1.

Referring to FIG. 9, the computer system 230 may be embodied as either an image processing device, e.g., a digital camera, or a mobile phone, a smartphone, or a tablet PC to which a digital camera is attached.

The computer system 230 includes a memory device 231, and a memory controller 232 configured to control a data processing operation (e.g., a write or read operation) of the memory device 231. The computer system 230 may further include an application processor 233, an image sensor 234, and a display unit 235.

The image sensor 234 in the computer system 230 transforms an optical image into digital signals, and transmits the transformed digital signals to the application processor 233 or the memory controller 232. Under control of the application processor 233, the transformed digital signals may be displayed on the display unit 235, or stored in the memory device 231 through the memory controller 232.

Also, data stored in the memory device 231 may be displayed on the display unit 235, under control of the application processor 233 or the memory controller 232.

In an exemplary embodiment, the memory controller 232 configured to control an operation of the memory device 231 may be embodied as a part of the application processor 233, or may be embodied as a chip installed separately from the application processor 233.

In an exemplary embodiment, the application processor 233 may include the SoC 100 illustrated in FIG. 1.

The inventive concept may be applied to a mobile device or a computer system including an SoC.

The SoC according to an exemplary embodiment of the inventive concept may redesign a system bus or reduce a load of the SoC using load information which is measured from each of a plurality of memory instances.

The foregoing is illustrative of embodiments of the present inventive concept and is not to be construed as limiting thereof. Although a few embodiments have been described, those skilled in the art will readily appreciate that many modifications in form and detail may be possible therein without materially departing from the spirit and scope of the present inventive concept.

What is claimed is:

1. A system-on-chip (SoC), comprising:
    at least one master, and a plurality of slaves;
    an interconnect configured to connect the at least one master and each of the plurality of slaves;
    a measurement block configured to connect each of the plurality of slaves and the interconnect using a plurality of channels and to measure a bandwidth, a latency, and an outstanding count of each of the channels; and
    a central controller configured to measure a load imbalance among the plurality of channels by weighting, for each channel, the bandwidth, the latency and the outstanding count for the channel to obtain a load for each channel, and comparing the loads of the channels.

2. The SoC according to claim 1, further comprising an application processor configured to perform dynamic voltage & frequency scaling (DVFS) based on the load imbalance.

3. The SoC according to claim 2, wherein the central controller compares the loads of the channels by calculating at least one of a minimum load value, a maximum load value, and a load variance with respect to the loads of the channels, and determines the load imbalance based thereon; and
    the DVFS is performed based on at least one of the minimum load value, the maximum load value, and the load variance.

4. The SoC according to claim 1, wherein the central controller compares the loads of the channels by calculating at least one of a minimum load value, a maximum load value, and a load variance with respect to the loads of the channels, and determines the load imbalance based thereon.

5. The SoC according to claim 1, wherein:
    the at least one master is a plurality of masters configured to generate requests with target addresses to access the plurality of slaves; and
    the SoC further comprising a plurality of channel efficiency enhancers configured to change, based on the measured load imbalance, the target addresses received from the plurality of masters to converted target addresses, each associated with a respective one of the slaves.

6. The SoC according to claim 4, wherein the at least one master includes an application processor, and
    the application processor operates a dynamic voltage & frequency scaling (DVFS) based on at least one of the minimum load value, the maximum load value, and the load variance.

7. The SoC according to claim 1, wherein the interconnect is redesigned based on the load imbalance.

8. The SoC according to claim 1, wherein each of the plurality of slaves includes a memory instance.

9. The SoC according to claim 1, wherein the at least one master transfers a request to one of the plurality of slaves, and
    a slave that receives the request transfers a response corresponding to the request to the at least one master.

10. A load imbalance detecting method of a system-on-chip (SoC) including at least one master, a plurality of slaves, and an interconnect that connects the at least one master and the plurality of slaves with each other, the method comprising:
    measuring a load with regard to each of the plurality of slaves using a plurality of channels; and
    measuring a load imbalance among the plurality of channels using the measured load information; and
    performing dynamic voltage & frequency scaling (DVFS) based on the measured load imbalance.

11. The load imbalance detecting method according to claim 10, wherein the measuring of the load with regard to each of the plurality of slaves using the plurality of channels further comprising:
    multiplying a weight by each of a bandwidth, a latency, and an outstanding count with regard to each of the plurality of slaves;
    adding results of the multiplying with each other; and measuring the load with regard to each of the plurality of slaves based on results of the adding.

12. The load imbalance detecting method according to claim 11, wherein the measuring of the load with regard to each of the plurality of slaves based on the added results comprises calculating a minimum load value, a maximum load value, and a load variance with regard to the load measured with regard to each of the plurality of slaves.

13. The load imbalance detecting method according to claim 12, wherein the at least one master comprises an application processor, and the dynamic voltage & frequency scaling (DVFS) is performed based on the minimum load value, the maximum load value, and the load variance with respect to the load of each of the plurality of slaves by the application processor.

14. A mobile device comprising:
a plurality of slaves;
a plurality of masters configured to generate requests with target addresses to access the plurality of slaves;
a plurality of channel efficiency enhancers configured to change, based on measured load imbalance information, the target addresses received from the plurality of masters to converted target addresses, each associated with a respective one of the slaves;
an interconnect configured to connect the plurality of masters and each of the plurality of slaves based on the converted target addresses;
a plurality of measurement components configured to measure loads of the plurality of slaves; and
a central controller configured to provide the load imbalance information among the plurality of slaves based on the measured loads.

15. The mobile device according to claim 14, wherein the central controller transmits the load imbalance information to at least one of the plurality of masters, the plurality of channel efficiency enhancers, and the interconnect.

16. The mobile device according to claim 15, wherein one of the plurality of channel efficiency enhancers updates an address conversion table to match the target addresses to the converted target addresses based on the load imbalance information.

17. The mobile device according to claim 14, wherein the load imbalance information comprises a latency value, a bandwidth value, and an outstanding count value.

18. The mobile device according to claim 17, wherein the load imbalance information further comprises weight values each of which corresponds to the latency value, the bandwidth value, and the outstanding count value.

19. The mobile device according to claim 14, further comprising an application processor configured to perform dynamic voltage & frequency scaling (DVFS) based on the load imbalance information.

* * * * *